US011952509B2

(12) United States Patent
Uzawa et al.

(10) Patent No.: US 11,952,509 B2
(45) Date of Patent: Apr. 9, 2024

(54) ELECTRICALLY CONDUCTIVE COMPOSITION, ELECTRICALLY CONDUCTIVE FILM, AND LAMINATE

(71) Applicant: Mitsubishi Chemical Corporation, Tokyo (JP)

(72) Inventors: Masashi Uzawa, Tokyo (JP); Shinji Saiki, Tokyo (JP); Akira Yamazaki, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 788 days.

(21) Appl. No.: 17/026,444

(22) Filed: Sep. 21, 2020

(65) Prior Publication Data

US 2021/0009818 A1 Jan. 14, 2021

Related U.S. Application Data

(63) Continuation of application No. PCT/JP2019/015602, filed on Apr. 10, 2019.

(30) Foreign Application Priority Data

Apr. 10, 2018 (JP) ................................ 2018-075578

(51) Int. Cl.
*C09D 5/24* (2006.01)
*C08G 73/02* (2006.01)
*C08K 5/3415* (2006.01)
*C09D 7/63* (2018.01)
*C09D 7/65* (2018.01)
*C09D 179/02* (2006.01)
*H01B 1/12* (2006.01)

(52) U.S. Cl.
CPC ........... *C09D 5/24* (2013.01); *C08G 73/0273* (2013.01); *C08K 5/3415* (2013.01); *C09D 7/63* (2018.01); *C09D 7/65* (2018.01); *C09D 179/02* (2013.01); *H01B 1/127* (2013.01)

(58) Field of Classification Search
CPC .......... A47J 31/369; A47J 31/46; A47J 31/60; A61K 2039/505; A61K 39/395; A61K 39/39558; A61P 1/00; A61P 35/00; A61P 35/04; A61P 43/00; B08B 13/00; B08B 3/04; C07K 16/26; C07K 16/3046; C07K 2317/24; C07K 2317/73; C07K 2317/76; C07K 5/1016; C08G 73/0266; C08G 73/0273; C08K 5/3412; C08K 5/3415; C08L 39/06; C08L 79/02; C09D 179/02; C09D 201/02; C09D 5/24; C09D 7/63; C09D 7/65; G01N 2333/595; G01N 2800/52; G01N 33/57419; H01B 1/124; H01B 1/127; H01B 1/128
See application file for complete search history.

(56) References Cited

U.S. PATENT DOCUMENTS

| | | | |
|---|---|---|---|
| 5,589,108 | A | 12/1996 | Shimizu et al. |
| 2015/0132537 | A1 | 5/2015 | Fukuda et al. |
| 2016/0093413 | A1 | 3/2016 | Uzawa et al. |
| 2017/0261854 | A1 | 9/2017 | Yamazaki et al. |

FOREIGN PATENT DOCUMENTS

| | | | |
|---|---|---|---|
| CN | 105392846 | A | 3/2016 |
| CN | 106661335 | A | 5/2017 |
| EP | 3 144 351 | A1 | 3/2017 |
| JP | 7-196791 | A | 8/1995 |
| JP | 2016-80964 | A | 5/2016 |
| JP | 2018-12815 | A | 1/2018 |
| KR | 10-2016-0148616 | | 12/2016 |
| TW | 201413748 | A | 4/2014 |
| TW | 201522545 | A | 6/2015 |
| TW | 201546824 | A | 12/2015 |
| WO | WO 2014/017540 | A1 | 1/2014 |
| WO | WO 2015/174453 | A1 | 11/2015 |

OTHER PUBLICATIONS

Korean Office Action dated Jun. 28, 2023 in Korean Patent Application No. 10-2022-7040408 (with English machine translation), 8 pages.
Combined Taiwanese Office Action and Search Report dated Sep. 29, 2022 in Taiwanese Patent Application No. 108112482 (with English translation), 6 pages.
Notice of Reasons for Refusal dated Oct. 26, 2021 in Japanese Patent Application No. 2020-513424 (with English machine translation), 6 pages.
International Search Report dated Jun. 25, 2019 in PCT/JP2019/015602 filed Apr. 10, 2019 (with English Translation), 2 pages.
Extended European Search Report dated Apr. 20, 2021 in European Patent Application No. 197842914, 6 pages.
Korean Office Action dated Dec. 12, 2022 in Korean Patent Application No. 10-2020-7028416 (with English Translation), 7 pages.
Combined Chinese Office Action and Search Report dated Aug. 11, 2021 in Chinese Patent Application No. 201980020476.2 (with Machine translation obtained by Global Dossier), 16 pages.
Korean Office Action dated Jun. 20, 2022 in Korean Patent Application No. 10-2020-7028416 (with unedited computer generated English Translation), 7 pages.
Chinese Office Action dated Jan. 6, 2022 in Chinese Patent Application No. 201980020476.2 (with English translation), 11 pages.
Office Action dated Nov. 29, 2021 in corresponding Korean Patent Application No. 10-2020-7028416 (with English Translation), 8 pages.

(Continued)

*Primary Examiner* — Lawrence D Ferguson
(74) *Attorney, Agent, or Firm* — Oblon, McClelland, Maier & Neustadt, L.L.P.

(57) ABSTRACT

The conductive composition of the present invention includes a conductive polymer (A) having an acidic group, and a basic compound (B) having a cyclic amide and an amino group in its molecule. The conductive film of the present invention is formed from the conductive composition. The laminate of the present invention includes a substrate; an electron beam resist layer, formed on at least one surface of the substrate; and a conductive film formed on the electron beam resist layer.

6 Claims, No Drawings

(56) References Cited

OTHER PUBLICATIONS

Korean Office Action dated Sep. 27, 2023 in Korean Patent Application No. 10-2020-7028416 (with unedited computer-generated English Translation), 37 pages.

ELECTRICALLY CONDUCTIVE COMPOSITION, ELECTRICALLY CONDUCTIVE FILM, AND LAMINATE

This application is a continuation application of International Application No. PCT/JP2019/015602, filed on Apr. 10, 2019, which claims priority to Japanese Patent Application No. 2018-075578, filed Apr. 10, 2018, the contents of which are incorporated herein by reference.

TECHNICAL FIELD

The present invention relates to a conductive composition, a conductive film, and a laminate.

BACKGROUND ART

Patterning techniques using charged particle beams such as electron beams and ion beams are promising candidates of the next generation technology of photolithography. For improving the productivity with the use of charged particle beams, it is important to improve the sensitivity of the resist.

From this perspective, the mainstream process uses a highly sensitive chemically amplified resist that is allowed to generate an acid in its area exposed to light or irradiated with the charged particle beam, which is followed by a heat treatment called "post exposure bake (PEB)" to accelerate crosslinking reaction or decomposition reaction.

Incidentally, especially when the substrate is insulating, the patterning method using charged particle beams has a problem that the trajectory of the charged particle beam is bent due to an electric field generated by the charge (charge up) of the substrate, resulting in difficulty in obtaining a desired pattern.

As a means to solve this problem, there is a technique already known to be effective, which applies a conductive composition containing a conductive polymer to the surface of a resist layer to form a conductive coating film (hereinafter referred to as "conductive film") so as to coat the surface of the resist layer with the conductive film.

Polyaniline with an acidic group is known as a conductive polymer. The polyaniline with an acidic group shows conductivity without addition of a dopant.

The polyaniline with an acidic group can be obtained, for example, by polymerization of an aniline having an acidic group by an oxidant in the presence of a basic reaction auxiliary.

However, the purity of the polyaniline with an acidic group thus obtained is not necessarily high because such a polyaniline is obtained as a reaction mixture containing by-products such as oligomers, acidic substances (such as sulfate ions as decomposing products of monomers or an oxidant), basic substances (such as ammonium ions as decomposing products of a basic reaction auxiliary or an oxidant), which are formed as a result of side reactions, as well as residual monomers.

Further, when the polyaniline with an acidic group is applied to a chemically amplified resist, acidic and basic substances easily migrate to the resist layer when the resist layer is subjected to exposure, PEB treatment, and development with a conductive film formed thereon. As a result, the pattern shape and sensitivity can easily change and thus the resist layer is affected.

Specifically, in the case of a positive resist layer, the migration of an acidic substance from the conductive film to the resist layer results in dissolution of the resist layer at its unexposed region during development, causing resist loss of the resist layer, pattern thinning, sensitivity shift to the higher sensitivity-side, and the like.

On the other hand, when a basic substance migrates from the conductive film to the resist layer, the acid in the exposed region is deactivated, resulting in changes in pattern shape and sensitivity shift to the lower sensitivity-side.

In the case of a negative resist layer, the migration of the above byproducts from the conductive film to the resist layer cause the opposite respective phenomena.

For addressing this issue, a conductive composition with excellent electrical conductivity and less resist loss of a resist layer is proposed.

For example, Patent Document 1 discloses a conductive composition including a conductive polymer having an acidic group and a basic compound such as tetrabutylammonium hydroxide.

DESCRIPTION OF PRIOR ART

Patent Document

Patent Document 1: International Patent Application Publication No. 2014/017540

DISCLOSURE OF INVENTION

Problems to be Solved by the Invention

The recent trend of scale-down of semiconductor devices has made it necessary to manage resist shapes on the order of several nanometers.

For this reason, there has been a demand for, as an antistatic agent that can be used in next-generation processes for semiconductor devices, a conductive composition that can form a conductive film having a surface smoothness allowing for more complex, finer pattern shapes, namely a conductive film with less surface roughness.

However, the surface smoothness of the conductive film formed from the conductive composition described in Patent Document 1 is not necessarily satisfactory.

The present invention has been made in view of the above circumstances, and the object thereof is to provide a conductive composition capable of forming a conductive film which suffers less resist loss of a resist layer and is excellent in surface smoothness and conductivity.

Means to Solve the Problems

The embodiments of the present invention are as follows.

[1] A conductive composition including a conductive polymer (A) having an acidic group, and a basic compound (B) having a cyclic amide and an amino group in its molecule.

[2] The conductive composition according to [1], wherein the cyclic amide is a lactam.

[3] The conductive composition according to [1] or [2], wherein the basic compound (B) is a compound represented by formula (1):

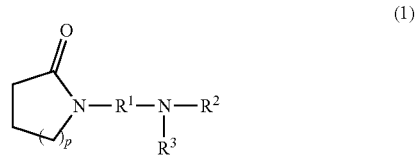

(1)

In the formula (1), $R^1$ represents a linear or branched alkylene group having 1 to 10 carbon atoms, each of $R^2$ and $R^3$ independently represents a hydrogen atom or a linear or branched alkyl group having 1 to 4 carbon atoms, and p represents an integer of 1 to 4.

[4] The conductive composition according to any one of [1] to [3], which further includes a nitrogen-containing heterocyclic compound (C) containing two or more nitrogen atoms in its molecule.

[5] The conductive composition according to [4], wherein a mass ratio of the basic compound (B) to the nitrogen-containing heterocyclic compound (C) (basic compound (B): nitrogen-containing heterocyclic compound (C)) is 0.5:99.5 to 99.5:0.5.

The conductive composition according to any one of [1] to [5], which further includes a water-soluble polymer (D) excluding the conductive polymer (A).

[7] A conductive film formed of the conductive composition of any one of [1] to [6].

[8] A laminate including: a substrate; an electron beam resist layer, formed on at least one surface of the substrate; and a conductive film of [7], formed on the resist layer.

Effect of the Invention

The conductive composition of the present invention can form a conductive film which suffers less resist loss of a resist layer and is excellent in surface smoothness and conductivity.

DESCRIPTION OF THE EMBODIMENTS

Hereinbelow, the present invention will be described in detail.

In the present invention, the term "conductive" means that a surface resistivity is $1 \times 10^{11}$ Ω/sq. or less. The surface resistivity is determined from the potential difference between electrodes when a constant current is flown between the electrodes.

Further, in the context of the present specification, the term "solubility" means that 0.1 g or more of a substance dissolves uniformly in 10 g (liquid temperature 25° C.) of simple water, water containing at least one of a base and a basic salt, water containing an acid, or a mixture of water and a water-soluble organic solvent. Furthermore, the term "water-soluble" means the solubility in water in relation to the aforementioned solubility.

In the context of the present specification, the "terminal" of the "terminal hydrophobic group" means a site other than repeating units constituting a polymer.

Further, in the context of the present specification, the term "weight average molecular weight" refers to a weight average molecular weight (in terms of sodium polystyrene sulfonate or polyethylene glycol) as measured by gel permeation chromatography (GPC).

[Conductive Composition]

The conductive composition of the first aspect of the present invention includes a conductive polymer (A), and a basic compound (B), which are described below. The conductive composition preferably further includes at least one of a compound (C), a water-soluble polymer (D) (excluding the conductive polymer (A)) and a solvent (E), which are described below. The conductive composition may, if necessary, also include at least one of a polymeric compound (F) and optional components, which are described below.

<Conductive Polymer (A)>

The conductive polymer (A) has an acidic group. When the conductive polymer (A) has an acidic group, the water solubility can be enhanced.

The conductive polymer having an acidic group is not particularly limited as long as the polymer has at least one group selected from the group consisting of a sulfonic acid group and a carboxy group in its molecule and the effects of the present invention can be obtained, and the examples thereof preferable from the viewpoint of solubility include conductive polymers described in Japanese Patent Unexamined Publication Nos. Sho 61-197633, Sho 63-39916, Hei 1-301714, Hei 5-504153, Hei 5-503953, Hei 4-32848, Hei 4-328181, Hei 6-145386, Hei 6-56987, Hei 5-226238, Hei 5-178989, Hei 6-293828, Hei 7-118524, Hei 6-32845, Hei 6-87949, Hei 6-256516, Hei 7-41756, Hei 7-48436, Hei 4-268331, and 2014-65898.

Specific examples of the conductive polymer having an acidic group include π-conjugated conductive polymers containing, as repeating units, at least one type of monomers selected from the group consisting of phenylene vinylene, vinylene, thienylene, pyrrolylene, phenylene, iminophenylene, isothianaphthene, furylene, and carbazolylene, each having its α position or β position substituted with at least one group selected from the group consisting of a sulfonic acid group and a carboxy group.

When the π-conjugated conductive polymer contains at least one repeating unit selected from the group consisting of iminophenylene and carbazolylene, examples thereof include a conductive polymer having at least one group selected from the group consisting of a sulfonic acid group and a carboxy group on the nitrogen atoms of the repeating units, and a conductive polymer having an alkyl group (or an ether bond-containing alkyl group) substituted with at least one group selected from the group consisting of a sulfonic acid group and a carboxy group on the nitrogen atoms of the repeating units.

Among these, from the perspective of conductivity and solubility, it is preferable to use conductive polymers having at least one type of monomer unit selected from the group consisting of thienylene, pyrrolylene, iminophenylene, phenylenevinylene, carbazolylene, and isothianaphthene, each having its β position substituted with at least one group selected from the group consisting of a sulfonic acid group and a carboxy group.

The conductive polymer (A) preferably has at least one type of monomer unit selected from the group consisting of monomer units represented by the following formulae (2) to (5) from the perspective of conductivity and solubility.

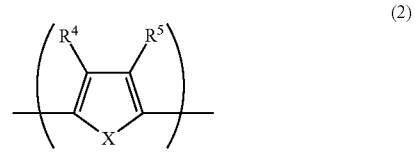

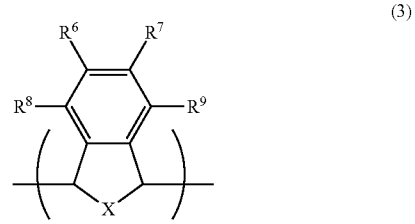

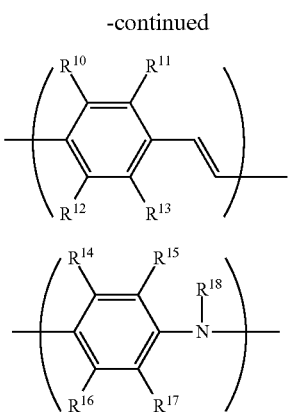

In the formulae (2) to (5), X represents a sulfur atom or a nitrogen atom, and each of $R^4$ to $R^{18}$ independently represents a hydrogen atom, a linear or branched alkyl group having 1 to 24 carbon atoms, a linear or branched alkoxy group having 1 to 24 carbon atoms, an acidic group, a hydroxy group, a nitro group, a halogen atom (—F, —Cl —Br or —I), —N($R^{19}$)$_2$, —NHCOR$^{19}$, —SR$^{19}$, —COOR$^{19}$, —COOR$^{19}$, —COR$^{19}$, —CHO or —CN. $R^{19}$ is preferably an alkyl group having 1 to 24 carbon atoms, an aryl group having 6 to 24 carbon atoms, or an aralkyl group having 7 to 24 carbon atoms.

However, at least one of $R^4$ and $R^5$ in the formula (2), at least one of $R^6$ to $R^9$ in the formula (3), at least one of $R^{10}$ to $R^{13}$ in the formula (4), and at least one of $R^{14}$ to $R^{18}$ in the formula (5) are each an acidic group or a salt thereof.

In this context, the "acidic group" means a sulfonic acid group (sulfo group) or a carboxylic acid group (carboxy group).

The sulfonic acid group may be present in an acid form (—SO$_3$H) or an ionic form (—SO$_3^-$). Further, the sulfonic acid group also encompasses a substituent having a sulfonic acid group (—R$^{20}$SO$_3$H).

On the other hand, the carboxylic acid group may be present in an acid form (—COOH) or an ionic form (—COO$^-$). Further, the carboxylic acid group also encompasses a substituent having a carboxylic acid group (—R$^{20}$COOH).

$R^{20}$ represents a linear or branched alkylene group having 1 to 24 carbon atoms, a linear or branched arylene group having 6 to 24 carbon atoms, or a linear or branched aralkylene group having 7 to 24 carbon atoms.

Examples of the salt of acidic group include alkali metal salts, alkaline earth metal salts, ammonium salts, and substituted ammonium salts of a sulfonic acid group or a carboxylic acid group.

Examples of the alkali metal salt include lithium sulfate, lithium carbonate, lithium hydroxide, sodium sulfate, sodium carbonate, sodium hydroxide, potassium sulfate, potassium carbonate, potassium hydroxide and derivatives having skeletons thereof.

Examples of the alkaline earth metal salt include magnesium salts, calcium salts and the like.

Examples of the substituted ammonium salt include aliphatic ammonium salts, saturated alicyclic ammonium salts, unsaturated alicyclic ammonium salts and the like.

Examples of the aliphatic ammonium salts include methyl ammonium, dimethyl ammonium, trimethyl ammonium, ethyl ammonium, diethyl ammonium, triethyl ammonium, methyl ethyl ammonium, diethyl methyl ammonium, dimethyl ethyl ammonium, propyl ammonium, dipropyl ammonium, isopropyl ammonium, diisopropyl ammonium, butyl ammonium, dibutyl ammonium, methyl propyl ammonium, ethyl propyl ammonium, methyl isopropyl ammonium, ethyl isopropyl ammonium, methyl butyl ammonium, ethyl butyl ammonium, tetramethyl ammonium, tetramethylol ammonium, tetra ethyl ammonium, tetra n-butyl ammonium, tetra sec-butyl ammonium, tetra t-butyl ammonium, and the like.

Examples of the saturated alicyclic ammonium salt include piperidinium, pyrrolidinium, morpholinium, piperazinium, and derivatives having skeletons thereof.

Examples of the unsaturated alicyclic ammonium salt include pyridinium, α-picolinium, β-picolinium, γ-picolinium, quinolinium, isoquinolinium, prolinium, and derivatives having skeletons thereof.

The conductive polymer (A) preferably has a monomer unit represented by the above formula (5) since high conductivity can be achieved. Among the monomer units represented by the above formula (5), from the perspective of excellent solubility, especially preferred is a monomer unit represented by the following formula (6).

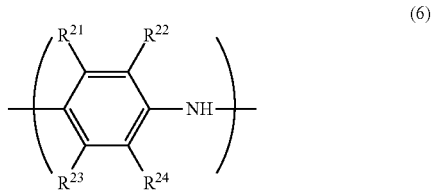

In the formula (6), each of $R^{21}$ to $R^{24}$ independently represents a hydrogen atom, a linear or branched alkyl group having 1 to 24 carbon atoms, a linear or branched alkoxy group having 1 to 24 carbon atoms, an acidic group, a hydroxy group, a nitro group or a halogen atom (—F, —Cl —Br or —I), with the proviso that at least one of $R^{21}$ to $R^{24}$ is an acidic group or a salt thereof.

As for the monomer unit represented by the above formula (6), it is preferable in terms of easy production that any one of $R^{21}$ to $R^{24}$ is a linear or branched alkoxy group having 1 to 4 carbon atoms, while another one of $R^{21}$ to $R^{24}$ is a sulfonic acid group, and the remainder is hydrogen.

In the conductive polymer (A), for achieving very good solubility, the number of acidic group-bonded aromatic rings is preferably 50% or more, more preferably 70% or more, even more preferably 90% or more, and most preferably 100%, relative to the total number of aromatic rings present in the polymer.

The number of acidic group-bonded aromatic rings relative to the total number of aromatic rings present in the polymer refers to a value calculated from the compounding ratio of monomers at the production of the conductive polymer (A).

Further, with respect to substituents on the aromatic rings of the monomer units in the conductive polymer (A), the substituents other than the acidic group are preferably electron donating groups for imparting reactivity to the monomers. Specifically, the substituents are preferably alkyl groups having 1 to 24 carbon atoms, alkoxy groups having 1 to 24 carbon atoms, halogen groups (—F, —Cl, —Br or —I) and the like, and alkoxy groups having 1 to 24 carbon atoms are most preferable from the perspective of electron donation.

The conductive polymer (A) is preferably a compound having a structure represented by the following formula (7) since high conductivity and solubility can be achieved.

Among the compounds having a structure represented by the formula (7), poly(2-sulfo-5-methoxy-1,4-iminophenylene) is particularly preferable.

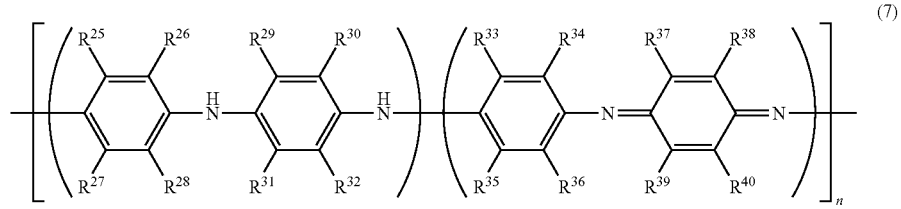

(7)

In the formula (7), each of $R^{25}$ to $R^{40}$ independently represents a hydrogen atom, a linear or branched alkyl group having 1 to 4 carbon atoms, a linear or branched alkoxy group having 1 to 4 carbon atoms, an acidic group, a hydroxy group, a nitro group or a halogen atom (—F, —Cl —Br or —I). At least one of $R^{25}$ to $R^{40}$ is an acidic group or a salt thereof. Further, n represents a polymerization degree. In the present invention, n is preferably an integer of 5 to 2500.

It is desirable that at least a part of the acidic groups possessed by the conductive polymer (A) is in a free acid form from the perspective of conductivity improvement.

From the perspective of conductivity, solubility and film formability, the weight average molecular weight of the conductive polymer (A) is preferably 1,000 to 1,000,000, more preferably 1,500 to 800,000, still more preferably 2,000 to 500,000, and particularly preferably 2,000 to 100,000, in terms of sodium polystyrene sulfonate as determined by GPC. When the weight average molecular weight of the conductive polymer (A) is less than 1000, good solubility may be achieved, but the conductivity and the film formability may be insufficient. On the other hand, when the weight average molecular weight exceeds 1,000,000, good conductivity may be achieved, but the solubility may be insufficient.

The term "film formability" refers to an ability to form a uniform film without cissing etc., which can be evaluated by a method such as spin coating on glass.

As for the method for producing the conductive polymer (A), there is no particular limitation and any known method can be employed as long as the desired effect of the present invention is available.

Specific examples of the method include a method of polymerizing polymerizable monomers (raw material monomers) capable of forming any of the above monomer units by various synthesis methods such as a chemical oxidation method, an electrolytic oxidation method and the like. As such method, for example, the synthesis methods described in Japanese Unexamined Patent Application Publication Nos. Hei 7-196791 and Hei 7-324132 can be adopted.

An example of method for producing the conductive polymer (A) is described below.

For example, the conductive polymer (A) can be obtained by polymerizing raw material monomers using an oxidant in the presence of a basic reaction auxiliary.

Examples of the basic reaction auxiliary include inorganic bases (e.g., sodium hydroxide, potassium hydroxide, lithium hydroxide, etc.), ammonia, aliphatic amines, cyclic saturated amines, and cyclic unsaturated amines.

Examples of the oxidant include peroxodisulfuric acids (e.g., peroxodisulfuric acid, ammonium peroxodisulfate, sodium peroxodisulfate, potassium peroxodisulfate, etc.), hydrogen peroxide, etc.

Examples of the polymerization method includes a method of dropping a mixture of raw material monomers and a basic reaction auxiliary into an oxidant solution, a method of dropping an oxidant solution into a mixture of raw material monomers and a basic reaction auxiliary, and a method of dropping a mixture of raw material monomers and a basic reaction auxiliary as well as an oxidant solution into a reaction vessel simultaneously.

After the polymerization, the solvent is usually separated by a separation device such as a centrifugal separator. The conductive polymer (A) is obtained by drying the filtered material after washing with a washing solution if necessary.

The conductive polymer (A) obtained in this manner may contain low molecular weight materials such as raw material monomers (unreacted monomers), oligomers formed by side reactions, the oxidant, and the basic reaction auxiliary. These low molecular weight materials cause the deterioration of conductivity.

Therefore, it is preferable to purify the conductive polymer (A) to remove the low molecular weight materials.

The method for purifying the conductive polymer (A) is not particularly limited, any purification methods can be employed, such as ion exchange method, acid cleaning in a protonic acid solution, removal by heat treatment, and neutralization and precipitation; however, the ion exchange method is particularly effective because a highly-purified conductive polymer (A) can obtained with ease.

Examples of the ion exchange method include a column- or batch-treatment using ion exchange resins such as cation exchange resins or anion exchange resins; electrodialysis methods, etc.

When the conductive polymer (A) is purified by the ion exchange method, it is preferable to dissolve a reaction mixture obtained by the polymerization in an aqueous medium to a desired solids concentration, and then allow the resulting polymer solution to contact an ion exchange resin.

The aqueous media may be water, an organic solvent, or a solvent mixture of water and an organic solvent. The organic solvent may be the same as the solvent (E) described below.

The concentration of the conductive polymer (A) in the polymer solution is preferably 0.1 to 20% by mass, and more preferably 0.1 to 10% by mass from the viewpoint of industrial efficiency and purification efficiency.

The amount of the conductive polymer (A) is preferably 5 to 90 parts by mass, more preferably 10 to 80 parts by mass, and even more preferably 20 to 75 parts by mass, with respect to 100 parts by mass of the total of the conductive polymer (A), the basic compound (B), the compound (C) and the water-soluble polymer (D). When the amount of the conductive polymer (A) is within the range described above, it is possible to form a conductive coating film (hereinafter referred to as "conductive film") having a further improved conductivity.

<Basic Compound (B)>

The basic compound (B) has a cyclic amide and an amino group in its molecule. Lactams are preferred as the cyclic amide.

The basic compound (B) is preferably a compound represented by the following formula (1).

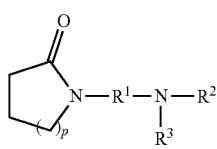

In the formula (1), $R^1$ represents a linear or branched alkylene group having 1 to 10 carbon atoms, each of $R^2$ and $R^3$ independently represents a hydrogen atom or a linear or branched alkyl group having 1 to 4 carbon atoms, and p represents an integer of 1 to 4.

The carbon number of $R^1$ is preferably 1 to 7, and more preferably 2 to 5. It is preferable that at least one of $R^2$ and $R^3$ is a hydrogen atom, and it is more preferable that both $R^2$ and $R^3$ are hydrogen atoms.

Examples of the compound represented by the formula (1) include 1-(3-aminopropyl)-2-pyrrolidone and N-(3-aminopropyl)-ε-caprolactam.

One of these compounds may be used alone, or two or more of them may be used in the form of a mixture thereof with an appropriate blending ratio.

The amount of the basic compound (B) is preferably 1 to 70 parts by mass, more preferably 5 to 60 parts by mass, and even more preferably 10 to 50 parts by mass, with respect to 100 parts by mass of the total of the conductive polymer (A), the basic compound (B), the compound (C) and the water-soluble polymer (D). When the amount of the basic compound (B) is not less than the lower limit described above, the diffusion of the acidic substance from the conductive film to the resist layer by heating can be sufficiently suppressed when the conductive film is formed on the resist layer using the conductive composition of the first aspect of the present invention. In addition, the surface smoothness of the conductive film is further improved. On the other hand, when the amount of the basic compound (B) is not more than the upper limit described above, it is possible to retain the performance of the conductive film, such as conductivity and coatability.

<Compound (C)>

The compound (C) is a nitrogen-containing heterocyclic compound (C) containing two or more nitrogen atoms in its molecule.

The compound (C) is not particularly limited as long as it includes two or more nitrogen atoms in its molecule and has a heterocyclic structure, and the effect of the present invention can be obtained, but a compound having a boiling point of 120° C. or higher is preferable.

Examples of the compound (C) include pyridine derivatives having a tertiary amino group as a substituent, such as 4-dimethylaminopyridine, 4-dimethylaminomethylpyridine, and 3,4-bis(dimethylamino)pyridine; 1,5-diazabicyclo[4.3.0]-5-nonene (DBN), 1,8-diazabicyclo[5.4.0]-7-undecene (DBU), and derivatives thereof. Among these, from the perspective of excellent water solubility, 4-dimethylaminopyridine, 4-dimethylaminomethylpyridine, 1,5-diazabicyclo[4.3.0]-5-nonene (DBN), and 1,8-diazabicyclo[5.4.0]-7-undecene (DBU) are preferable.

One of these compounds (C) may be used alone, or two or more of them may be used in the form of a mixture thereof with an appropriate blending ratio.

The amount of the compound (C) is preferably 1 to 65 parts by mass, more preferably 1 to 60 parts by mass, and even more preferably 2 to 50 parts by mass, with respect to 100 parts by mass of the total of the conductive polymer (A), the basic compound (B), the compound (C) and the water-soluble polymer (D). When the amount of the compound (C) is not less than the lower limit described above, the diffusion of the acidic substance from the conductive film to the resist layer can be more effectively suppressed. On the other hand, when the amount of the compound (C) is not more than the upper limit described above, the conductivity of the conductive film is further improved.

The mass ratio of the basic compound (B) to the compound (C) (basic compound (B):compound (C)) is preferably 0.5:99.5 to 100:0, more preferably 2:98 to 100:0, even more preferably 5:95 to 100:0, and particularly preferably 60:40 to 100:0. In one aspect of the present invention, the mass ratio of the basic compound (B) to the compound (C) (basic compound (B):compound (C)) is preferably 0.5:99.5 to 99.5:0.5. When the mass ratio of the basic compound (B) to the compound (C) is within the range described above, an excellent balance is achieved between suppression of the resist loss of the resist layer and improvement of the surface smoothness of the conductive film.

<Water-Soluble Polymer (D)>

From the water-soluble polymer (D), the conductive polymer (A) is excluded.

The water-soluble polymer (D) preferably has a nitrogen-containing functional group and a terminal hydrophobic group in its molecule since such a water-soluble polymer (D) is likely to exhibit surface activity, can easily suppress the influence on the resist, and readily enables improvement of the surface smoothness of the conductive film.

As the nitrogen-containing functional group, an amide group is preferable from the perspective of solubility.

The carbon number of the terminal hydrophobic group is preferably 4 or more, and more preferably 8 or more.

The terminal hydrophobic group is preferably one having an alkyl chain, an aralkyl chain or an aryl chain in the hydrophobic group. Specifically, from the perspective of solubility and surface activity, the terminal hydrophobic group preferably contains at least one selected from the group consisting of an alkyl chain having 4 to 100 carbon atoms, an aralkyl chain having 7 to 100 carbon atoms, and an aryl chain having 6 to 100 carbon atoms. The number of carbon atoms of each of these alkyl chain, aralkyl chain and aryl chain is preferably 4, 6 or 7 to 70, and more preferably 8 to 30.

Specific examples of such terminal hydrophobic groups include alkyl groups, aralkyl groups, aryl groups, alkoxy groups, aralkyloxy groups, aryloxy groups, alkylthio groups, aralkylthio groups, arylthio groups, primary or secondary alkylamino groups, aralkylamino groups, and arylamino groups. Among these, alkylthio groups, aralkylthio groups, and arylthio groups are preferable, and alkylthio groups are particularly preferable from the perspective of solubility and surface activity.

The water-soluble polymer (D) is preferably a compound having a main chain structure formed of a homopolymer of a vinyl monomer having an amide bond, or a copolymer of a vinyl monomer having an amide bond and a vinyl monomer having no amide bond (another vinyl monomer), and having a hydrophobic group at a site other than repeating units constituting the polymer.

Examples of the vinyl monomer having an amide bond include acrylamide and derivatives thereof, N-vinyl lactam and the like. Specific examples thereof include acrylamide, N,N-dimethyl acrylamide, N-isopropyl acrylamide, N,N-diethyl acrylamide, N,N-dimethyl aminopropyl acrylamide, t-butyl acrylamide, diacetone acryl amide, N,N'-methylenebisacrylamide, N-vinyl-N-methyl acrylamide, N-vinyl pyrrolidone, N-vinyl caprolactam and the like. Among these, from the perspective of solubility, acrylamide, N-vinylpyrrolidone, N-vinylcaprolactam and the like are particularly preferable.

The method for introducing the terminal hydrophobic group into the water-soluble polymer (D) is not particularly limited as long as the effect of the present invention is available, but a method of introducing the terminal hydrophobic group by selecting a chain transfer agent for the vinyl polymerization is simple and preferred.

For example, the water-soluble polymer (D) having a nitrogen-containing functional group and a terminal hydrophobic group having 4 or more carbon atoms in its molecule can be produced by polymerizing a vinyl monomer having an amide bond and, if necessary, another vinyl monomer, in the presence of a polymerization initiator and a chain transfer agent having 4 or more carbon atoms.

The chain transfer agent is not particularly limited as long as the above-mentioned terminal hydrophobic group can be introduced and the effect of the present invention is available, but it is preferable to use thiol, disulfide, thioether etc., with which an alkylthio group, an aralkylthio group, an arylthio group etc. which are preferable terminal hydrophobic groups can be easily introduced.

The number of repeating units of the main chain structure moiety of the water-soluble polymer (D), that is, the polymerization degree of the above-mentioned vinyl monomer having an amide bond, is preferably 2 to 100,000, more preferably 2 to 1000, and particularly preferably 3 to 200, from the perspective of solubility of the water-soluble polymer (D).

From the perspective of surface activity, with respect to the water-soluble polymer (D), the ratio of a molecular weight of the main chain structure moiety (hereinafter also referred to as "molecular weight of water-soluble moiety") relative to a molecular weight of the terminal hydrophobic moiety (hereinafter also referred to as "molecular weight of hydrophobic moiety"), i.e., (molecular weight of water-soluble moiety)/(molecular weight of hydrophobic moiety), is preferably 1 to 1,500, and more preferably 5 to 1,000. The "molecular weight of water-soluble moiety" and "molecular weight of hydrophobic moiety" can be calculated from the weight average molecular weight of the obtained water-soluble polymer (D), and the compounding ratio of the monomer for constituting the main chain structure moiety and the chain transfer agent for constituting the terminal hydrophobic moiety.

The weight average molecular weight of the water-soluble polymer (D) is preferably 100 to 1,000,000, more preferably 100 to 100,000, even more preferably 600 or more and less than 2,000, and particularly preferably 600 to 1,800, in terms of polyethylene glycol in GPC. When the weight average molecular weight of the water-soluble polymer (D) is not less than the lower limit value described above, the effect of improving the coatability of the conductive composition can be more easily achieved. On the other hand, when the weight average molecular weight of the water-soluble polymer (D) is not more than the upper limit value described above, the water solubility of the conductive composition is enhanced. In particular, when the weight average molecular weight of the water-soluble polymer (D) is 600 or more and less than 2000, an excellent balance is achieved between the practical solubility thereof in water and the coatability of the conductive composition.

The water-soluble polymer (D) is preferably a compound represented by the following formula (8) from the perspective of solubility and the like.

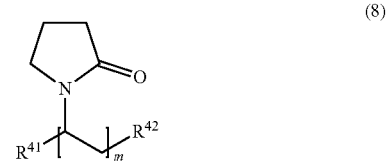

(8)

In the formula (8), each of $R^{41}$ and $R^{42}$ independently represents an alkylthio group, an aralkylthio group, an arylthio group or a hydrocarbon group, with the proviso that at least one of $R^{41}$ and $R^{42}$ is an alkylthio group, an aralkylthio group or an arylthio group; and m represents an integer of 2 to 100,000.

Examples of the hydrocarbon group include a linear or branched alkyl group having 1 to 20 carbon atoms, a linear or branched alkenyl group having 2 to 20 carbon atoms, and a linear or branched alkynyl group having 2 to 20 carbon atoms.

The amount of the water-soluble polymer (D) is preferably 5 to 80 parts by mass, more preferably 10 to 70 parts by mass, and even more preferably 10 to 65 parts by mass, with respect to 100 parts by mass of the total of the conductive polymer (A), the basic compound (B), the compound (C) and the water-soluble polymer (D). When the amount of the water-soluble polymer (D) is within the range described above, the coatability of the conductive composition on the resist layer is further improved. In addition, the surface smoothness of the conductive film can be further improved while further suppressing the resist loss of the resist layer.

<Solvent (E)>

The solvent (E) is not particularly limited as long as it can dissolve the conductive polymer (A), the basic compound (B), the compound (C) and the water-soluble polymer (D), and the effect of the present invention can be obtained, and examples thereof include water and a mixed solvent of water and an organic solvent.

Examples of the organic solvent include alcohols such as methanol, ethanol, isopropyl alcohol, propyl alcohol and butanol; ketones such as acetone and ethyl isobutyl ketone; ethylene glycols such as ethylene glycol and ethylene glycol methyl ether; propylene glycols such as propylene glycol, propylene glycol methyl ether, propylene glycol ethyl ether, propylene glycol butyl ether and propylene glycol propyl ether; amides such as dimethylformamide and dimethylacetamide; and pyrrolidones such as N-methylpyrrolidone and N-ethylpyrrolidone.

When a mixed solvent of water and an organic solvent is used as the solvent (E), the mass ratio of water to an organic solvent (water/organic solvent) is preferably 1/100 to 100/1, and more preferably 2/100 to 100/2.

<Polymeric Compound (F)>

The conductive composition of the first aspect of the present invention may include a polymer compound (F), if necessary, for the purpose of further improving the strength and surface smoothness of the coating film.

Specific examples of the polymeric compound (F) include polyvinyl alcohol derivatives such as polyvinyl formal and polyvinyl butyral, polyacrylamides such as polyacrylamide, poly(N-t-butyl acrylamide) and polyacrylamide methyl propane sulfonate, polyvinyl pyrrolidones, polyacrylic acids, water-soluble alkyd resins, water-soluble melamine resins, water-soluble urea resins, water-soluble phenol resins, water-soluble epoxy resins, water-soluble polybutadiene resins, water-soluble acrylic resins, water-soluble urethane resins, water-soluble acrylic styrene copolymer resins, water-soluble vinyl acetate acrylic copolymer resins, and water-soluble polyester resins, water-soluble styrene maleic acid copolymer resins, water-soluble fluoro resins, and copolymers thereof.

<Optional Components>

Further, the conductive composition of the first aspect of the present invention may optionally contain any of various additives, such as a pigment, an antifoaming agent, an ultraviolet light absorber, an antioxidant, a heat resistance improver, a leveling agent, and an antidripping agent, matting agents and preservatives.

<Production Method>

The conductive composition of the first aspect of the present invention can be obtained, for example, by mixing a solution of the conductive polymer (A) with the basic compound (B), and, if necessary, any one or more of the compound (C), the water-soluble polymer (D), the polymeric compound (F) and the optional components. Generally, it is preferable that the solution of the conductive polymer (A) is kept at room temperature and the basic compound (B) and the like are added while stirring. The resulting mixture may further be diluted with the solvent (E) as needed.

In the context of the present invention, "room temperature" means a temperature of 25° C.

<Effects>

As described above, conventionally, when a conductive film is formed on the resist layer, the migration of an acidic substance such as sulfate, which is a decomposition product of a monomer or an oxidant, from the conductive film to the resist layer tends to result in pattern thinning, resist loss, and sensitivity shift to the higher sensitivity-side in the case of a positive resist. On the other hand, in the case of a negative resist, conversely, the pattern shape change and the sensitivity shift to the lower sensitivity-side are likely to occur.

In addition, the acidic groups released from the conductive polymer (A) due to heating during the formation of the conductive film may migrate to the resist.

However, according to the conductive composition of the first aspect of the present invention, the presence of the above-mentioned conductive polymer (A) and basic compound (B) allows the basic compound (B) to act on the monomers or sulfates so as to facilitate the generation of stable salts. As a result, the migration of the acidic substances from the conductive film to the resist layer is suppressed.

In addition, it is presumed that the basic compound (B) efficiently acts on the acidic groups in the conductive polymer (A), which enables the conductive polymer (A) to show increased stability. In this context, efficiently acting on the acidic groups in the conductive polymer (A) means that stable neutralization is enabled due to the high boiling point and strong basicity. As a result, the generation of acidic substances due to destabilization of acidic groups contained in the conductive polymer (A) in the conductive film is suppressed, and the migration of acidic substances from the conductive film to the resist layer is suppressed.

Therefore, particularly in the pattern formation method with a charged particle beam using a chemically amplified resist, the migration of the acidic substances from the conductive film to the resist layer can be suppressed, thereby reducing undesirable consequences such as the resist loss of the resist layer.

Furthermore, the use of the basic compound (B) enables the formation of a conductive film having excellent surface smoothness and conductivity.

Particularly, when the conductive composition further contains the compound (C) described above, the conductivity of the conductive film is further improved.

Further, the water-soluble polymer (D) described above does not contain an acid or a base and hardly generate a by-product by hydrolysis, and hence enables the improvement of coatability of the conductive composition without adversely affecting the resist layer. Therefore, the presence of the water-soluble polymer (D) in the conductive composition enables further suppression of undesirable consequences such as the resist loss of the resist layer. In addition, the surface smoothness of the conductive film is further improved.

The conductive composition of the first aspect of the present invention can form a conductor having an insoluble or peelable-soluble coating film (conductive film) when heated after being formed into a conductor.

This is advantageous in that the conductor is applicable either as a permanent antistatic film or a temporary antistatic film used during the process.

[Conductive Film]

The conductive film of the second aspect of the present invention is formed from the conductive composition of the first aspect of the present invention described above.

An example of the method for producing the conductive film is described below.

The method of the present embodiment for producing the conductive film includes a step of coating the conductive composition of the first aspect of the present invention on a substrate, followed by drying to form a coating film (coating step), and a step of heating the dried coating film (heating step).

(Coating Step)

The coating step is a step of coating the conductive composition of the first aspect of the present invention on a substrate, followed by drying to form a coating film.

The substrate is not particularly limited as long as the effect of the present invention is available. Examples of the substrate include molded articles and films of various polymers such as polyester resins (e.g., polyethylene terephthalate (PET) and polybutylene terephthalate (PBT)), polyolefin resins represented by polyethylene and polypropylene, polyvinyl chloride, nylon, polystyrene, polycarbonate, epoxy resins, fluoro resins, polysulfone, polyimide, polyurethane, phenol resins, silicon resins, and synthetic papers; and papers, iron, glass, quartz glass, various wafers, aluminum, copper, zinc, nickel, stainless steel and the like; and products obtainable by coating surfaces of these substrates with various coating materials, photosensitive resins, resists and the like.

The shape of the substrate is not particularly limited and may be a plate or any other shape.

The conductive composition is preferably coated on the substrate so that a coating film having a thickness of 5 to 30 nm is formed after drying.

The method of coating the conductive composition on the substrate is not particularly limited as long as the effect of the present invention can be obtained. Examples of the method include spin coating, spray coating, dip coating, roll coating, gravure coating, reverse coating, roll brush method, air knife coating and curtain coating.

The coating of the conductive composition on the substrate may be performed before or during the process of producing the substrate, such as uniaxial stretching, biaxial stretching, molding, or embossing, or may be performed on the produced substrate after the aforementioned process.

Further, the conductive composition can be used to form a coating film by overcoating the substrate which has already been coated with various coating materials or photosensitive materials.

(Heating Step)

The heating step is a step of heating the dried coating film.

The heating temperature is preferably in the range of 40° C. to 250° C., and more preferably in the range of 60° C. to 200° C., from the perspective of conductivity. Further, the time for heat treatment is preferably within 1 hour, and more preferably within 30 minutes, from the perspective of stability.

Instead of the heating step, the coating film may be allowed to stand at room temperature (25° C.) for 1 to 60 minutes (standing period).

[Conductor]

The conductor of the third aspect of the present invention includes a substrate and a conductive film formed by coating the conductive composition of the first aspect of the present invention on at least a part of the substrate. That is, the conductive film contained in the conductor is the conductive film of the second aspect of the present invention.

Examples of the substrate include the substrates exemplified above in the description of the conductive film of the second aspect of the present invention.

When the substrate is a plate, the conductive film may be formed over the entire surface of one side of the substrate, or formed on a part of one side of the substrate. The conductive film may also be formed on at least a part of the other side of the substrate. Further, the conductive film may be provided on at least a part of the lateral sides of the substrate.

When the substrate has a shape other than a plate, the conductive film may be formed over the entire surface of the substrate or on a part of the surface of the substrate.

The conductor can be obtained by forming a conductive film on a substrate. The specific production method is the same as the method for producing the conductive film of the second aspect of the present invention. That is, the conductor is produced through the coating step and the heating step. The standing period may be provided instead of performing the heating step.

[Laminate]

The laminate of the fourth aspect of the present invention includes a substrate; an electron beam resist layer (hereinafter, also simply referred to as "resist layer"), formed on at least one surface of the substrate; and a conductive film formed on the resist layer.

Examples of the substrate include the substrates exemplified above in the description of the conductive film of the second aspect of the present invention. The conductive film is that of the second aspect of the present invention.

Examples of the resist layer include a layer made of a positive or negative chemically amplified resist.

The positive chemically amplified resist is not particularly limited as long as it has sensitivity to an electron beam, and known ones can be used. Typically, those containing an acid generator that generates an acid upon irradiation with an electron beam and a polymer containing a structural unit having an acid-decomposing group are used.

The negative chemically amplified resist is not particularly limited as long as it has sensitivity to an electron beam, and known ones can be used. Typically, those containing an acid generator that generates an acid upon irradiation with an electron beam, a polymer soluble in a developing solution, and a crosslinking agent are used.

The laminate is obtained by forming the resist layer and the antistatic film on the substrate in this order.

The resist layer can be formed by a known method. For example, a positive or negative resist layer is formed by applying an organic solvent solution of a positive or negative chemically amplified resist to one surface of a substrate, followed by heating (prebaking) as necessary.

The conductive film is formed by coating the conductive composition of the first aspect of the present invention on the surface of the resist layer, followed by drying to form a coating film, and subjecting the dried coating film to a heat treatment. The specific production method is the same as the method for producing the conductive film of the second aspect of the present invention. The standing period may be provided instead of performing the heating step.

Other embodiments of the present invention are as enumerated below.

<1> A conductive composition including a conductive polymer (A) having an acidic group, a basic compound (B) having a cyclic amide and an amino group in its molecule, and, optionally, a nitrogen-containing heterocyclic compound (C) containing two or more nitrogen atoms in its molecule.

<2> The conductive composition according to <1>, wherein the cyclic amide is a lactam.

<3> The conductive composition according to <1> or <2>, wherein the basic compound (B) is a compound represented by the formula (1).

<4> The conductive composition according to <3>, wherein the compound represented by the formula (1) is 1-(3-aminopropyl)-2-pyrrolidone or N-(3-aminopropyl)-ϵ-caprolactam.

<5> The conductive composition according to any one of <1> to <4>, wherein a mass ratio of the basic compound (B) to the nitrogen-containing heterocyclic compound (C) (basic compound (B):nitrogen-containing heterocyclic compound (C)) is 0.5:99.5 to 100:0.

<6> The conductive composition according to [5], wherein the mass ratio of the basic compound (B) to the nitrogen-containing heterocyclic compound (C) (basic compound (B):nitrogen-containing heterocyclic compound (C)) is 5:95 to 100:0.

<7> The conductive composition according to [6], wherein the mass ratio of the basic compound (B) to the nitrogen-containing heterocyclic compound (C) (basic compound (B):nitrogen-containing heterocyclic compound (C)) is 60:40 to 100:0.

<8> The conductive composition according to any one of <1> to <4>, wherein the mass ratio of the basic compound (B) to the nitrogen-containing heterocyclic compound (C) (basic compound (B):nitrogen-containing heterocyclic compound (C)) is 0.5:99.5 to 99.5:0.5.

<9> The conductive composition according to <8>, wherein the mass ratio of the basic compound (B) to the nitrogen-containing heterocyclic compound (C) (basic compound (B):nitrogen-containing heterocyclic compound (C)) is 5:95 to 99.5:0.5.

<10> The conductive composition according to <9>, wherein the mass ratio of the basic compound (B) to the nitrogen-containing heterocyclic compound (C) (basic compound (B):nitrogen-containing heterocyclic compound (C)) is 60:40 to 99.5:0.5.

<11> The conductive composition according to any one of <1> to <10>, which further includes a water-soluble polymer (D) excluding the conductive polymer (A).

<12> The conductive composition according to <11>, wherein the water-soluble polymer (D) is a compound represented by the formula (8).

<13> The conductive composition according to <11> or <12>, wherein the amount of the water-soluble polymer (D) is 5 to 80 parts by mass with respect to 100 parts by mass of the total of the conductive polymer (A), the basic compound (B), the nitrogen-containing heterocyclic compound (C) and the water-soluble polymer (D).

<14> The conductive composition according to <13>, wherein the amount of the water-soluble polymer (D) is 10 to 65 parts by mass with respect to 100 parts by mass of the total of the conductive polymer (A), the basic compound (B), the nitrogen-containing heterocyclic compound (C) and the water-soluble polymer (D).

<15> The conductive composition according to any one of <1> to <14>, wherein the conductive polymer (A) has a monomer unit represented by the formula (6).

<16> The conductive composition according to any one of <1> to <15>, wherein the amount of the conductive polymer (A) is 5 to 90 parts by mass with respect to 100 parts by mass of the total of the conductive polymer (A), the basic compound (B), the nitrogen-containing heterocyclic compound (C) and the water-soluble polymer (D).

<17> The conductive composition according to <16>, wherein the amount of the conductive polymer (A) is 20 to 75 parts by mass with respect to 100 parts by mass of the total of the conductive polymer (A), the basic compound (B), the nitrogen-containing heterocyclic compound (C) and the water-soluble polymer (D).

<18> The conductive composition according to any one of <1> to <17>, wherein the amount of the basic compound (B) is 1 to 70 parts by mass with respect to 100 parts by mass of the total of the conductive polymer (A), the basic compound (B), the nitrogen-containing heterocyclic compound (C) and the water-soluble polymer (D).

<19> The conductive composition according to <18>, wherein the amount of the basic compound (B) is 5 to 35 parts by mass with respect to 100 parts by mass of the total of the conductive polymer (A), the basic compound (B), the nitrogen-containing heterocyclic compound (C) and the water-soluble polymer (D).

<20> The conductive composition according to any of <1> to <19>, wherein the nitrogen-containing heterocyclic compound (C) is at least one selected from the group consisting of 4-dimethylaminopyridine, 4-dimethylaminomethylpyridine, 1,5-diazabicyclo[4.3.0]-5-nonene, and 1,8-diazabicyclo[5.4.0]-7-undecene.

<21> The conductive composition according to any one of <1> to <20>, wherein the amount of the nitrogen-containing heterocyclic compound (C) is 1 to 65 parts by mass with respect to 100 parts by mass of the total of the conductive polymer (A), the basic compound (B), the nitrogen-containing heterocyclic compound (C) and the water-soluble polymer (D).

<22> The conductive composition according to <21>, wherein the amount of the nitrogen-containing heterocyclic compound (C) is 1 to 10 parts by mass with respect to 100 parts by mass of the total of the conductive polymer (A), the basic compound (B), the nitrogen-containing heterocyclic compound (C) and the water-soluble polymer (D).

<23> The conductive composition according to any of <1> to <22>, further comprising a solvent (E).

<24> The conductive composition according to <23>, wherein the solvent (E) is water or a mixture of water and an organic solvent.

<25> The conductive composition according to <24>, wherein the organic solvent is at least one selected from the group consisting of methanol, ethanol, isopropyl alcohol, propyl alcohol, and butanol.

<26> The conductive composition according to any of <1> to <25>, which is for antistatic use in in charged particle beam lithography.

<27> A conductive film formed of the conductive composition of any one of <1> to <26>.

<28> A conductor including a substrate, and the conductive film of <27>, which is formed on at least a part of the substrate.

<29> A laminate including: a substrate; an electron beam resist layer, formed on at least one surface of the substrate; and the conductive film of <27>, formed on the resist layer.

EXAMPLES

Hereinbelow, the present invention will be specifically described in more detail by way of Examples which should not be construed as limiting the present invention.

The various measurements and evaluations were performed in the Examples and Comparative Examples by respective methods as described below.

[Measurement and Evaluation Methods]

<Evaluation of Conductivity>

1.3 mL of the conductive composition was dropped onto a 4-inch silicon wafer as a substrate, and spin-coated on the substrate so as to cover the entire surface of the substrate using a spin coater under the condition of 2000 rpm×60 seconds. The resulting was heat-treated on a hot plate at 80° C. for 2 minutes to form a conductive film with a thickness of about 20 nm on the substrate, thereby obtaining a conductor.

The surface resistivity [Ω/sq.] of the conductive film was measured by the 2-terminal method (distance between the electrodes=20 mm) using Hiresta X-MCP-HT800 (manufactured by Mitsubishi Chemical Analytech Co., Ltd.).

<Evaluation of Surface Smoothness>

A conductor was produced in the same manner as for the evaluation of conductivity.

An arithmetic mean roughness (Ra) [nm] of the conductive film was measured under the following measurement conditions using a stylus profilometer (Stylus profiler P-16+, manufactured by KLA-Tencor Corporation).

(Measurement Conditions)

Stylus: 2 μm, R60°
Needle pressure: 0.03 mg
Scanning range: 500 um
Scanning speed: 2 um/s <Evaluation by Resist Loss Test>

(Measurement of Resist Loss)

Using a chemically amplified electron beam resist (e.g., "FEP-171", which is a commercially available positive photoresist made by FUJIFILM Electronics Materials Co., Ltd.) (hereinafter simply referred to as "resist"), the resist loss of a resist layer was measured following the steps (1A) to (8A) described below.

(1A) Formation of resist layer: A resist was spin-coated onto a 4-inch silicon wafer so as to give a resist thickness of 0.2 μm using a spin coater at 2000 rpm for 60 seconds, followed by pre-baking at 130° C. for 90 seconds on a hot plate to remove the solvent and form a resist layer on the substrate.

(2A) Resist layer thickness measurement 1: A part of the resist layer formed on the substrate was peeled off, and the film thickness a [nm] of the resist layer in its initial state was measured using a stylus profilometer (Stylus profiler P-16+, manufactured by KLA-Tencor Corporation), taking the substrate surface as a reference position.

(3A) Formation of conductive film: 2 mL of the conductive composition was dropped on the resist layer and spin-coated at 2000 rpm for 60 seconds by a spin coater so as to cover the entire surface of the resist layer, followed by heat treatment on a hot plate at 80° C. for 2 minutes to form a conductive film having a thickness of about 30 nm on the resist layer.

(4A) Baking treatment: The substrate on which the conductive film and the resist layer were laminated was heated on the hot plate at 120° C. for 20 minutes in an air atmosphere, and the resulting substrate as such was allowed to stand in air at room temperature (25° C.) for 90 seconds.

(5A) Washing with water: The conductive film was washed away by running 20 mL of water, and the substrate was spinned at 2,000 rpm for 60 seconds using a spin coater to remove the water from the surface of the resist layer.

(6A) Development: 20 mL of a developing solution which was an aqueous solution of 2.38% by mass of tetramethylammonium hydroxide (TMAH) was dropped on the surface of the resist layer. After left standing for 60 seconds, the developing solution was removed from the surface of the resist layer by spinning the spin coater at 2000 rpm for 60 seconds, and the resulting was subsequently dried by allowing the spin coater to keep on spinning for 60 seconds.

(7A) Resist layer thickness measurement 2: A part of the resist layer was peeled off at a position located within 5 mm from the part where the resist layer had been peeled off in (2A) above, and the film thickness b [nm] of the resist layer after the development was measured using the stylus profilometer.

(8A) Calculation of resist loss: The value of the film thickness b was subtracted from the value of the film thickness a to calculate the resist loss c [nm] (c=a−b) of the resist layer.

(Measurement of Reference Resist Loss)

With respect to resist layers, there is a resist loss d [nm] peculiar to each resist depending on the storage period after the formation of the resist layer (hereinafter referred to as "reference resist loss"). This reference resist loss d which is not affected by the conductive film was measured following the steps (1B) to (6B) described below.

(1B) Formation of resist layer: A resist layer was formed on a substrate in the same manner as in (1A) above.

(2B) Resist layer thickness measurement 1: The initial film thickness a [nm] of the resist layer was measured in the same manner as in (2A) above.

(3B) Baking: Baking was carried out in the same manner as in (4A) above, except that the substrate having the resist layer laminated thereon was used.

(4B) Development: Development was carried out in the same manner as in (6A) above.

(5B) Resist layer thickness measurement 2: A part of the resist layer was peeled off at a position located within 5 mm from the part where the resist layer had been peeled off in (2B) above, and the film thickness e [nm] of the resist layer after the development was measured using the stylus profilometer.

(6B) Calculation of resist loss: The value of the film thickness e was subtracted from the value of the film thickness a to calculate the resist loss d [nm] (d=a−e) of the resist layer.

The reference resist loss d of the resist layer was 3 nm. (Calculation of Resist Loss of Resist Layer Due to Acidic Substances»

The value of reference resist loss d of the resist layer was subtracted from the value of resist loss c of the resist layer to calculate the resist loss f of the resist layer [nm] (f=c−d), which was caused by acidic substances migrated from the conductive film to the resist layer.

[Production of Conductive Polymer (A)]

Production Example 1: Production of Conductive Polymer (A-1)

1 mol of 3-aminoanisole-4-sulfonic acid was dissolved in 300 mL of a 4 mol/L pyridine solution (solvent: water/acetonitrile=3/7 (mass ratio)) at 0° C. to obtain a monomer solution.

Separately, 1 mol of ammonium peroxodisulfate was dissolved in 1 L of a solution of water/acetonitrile=3/7 (mass ratio) to obtain an oxidant solution.

Then, the monomer solution was added dropwise to the oxidant solution while cooling the oxidant solution to 5° C. After completion of the dropwise addition, the resulting mixture was further stirred at 25° C. for 12 hours to obtain a conductive polymer. Then, the resulting reaction mixture containing the conductive polymer was filtered by a centrifugal filter. Further, the obtained conductive polymer was washed with methanol and then dried to obtain 185 g of a powdery conductive polymer (A-1).

Production Example 2: Production of Conductive Polymer (A1-1)

23 g of the conductive polymer (A-1) obtained in Production Example 1 was dissolved in 980 g of pure water to obtain 1,000 g of a conductive polymer solution (A-1-1) having a solids concentration of 2% by mass.

500 mL of a cation exchange resin ("Amberlite IR-120B" manufactured by Organo Corporation) washed with ultrapure water was filled into a column.

1,000 g of the conductive polymer solution (A-1-1) was passed through this column at a rate of 50 mL/min (SV=6) to collect 900 g of the conductive polymer solution (A1-1-1) from which the basic substance and the like had been removed.

Next, another column was filled with 500 mL, of an anion exchange resin ("Amberlite 1RA410" manufactured by Organo Corporation) washed with ultrapure water.

900 g of the conductive polymer solution (A1-1-1) was passed through this column at a rate of 50 mL/min (SV=6) to collect 800 g of the conductive polymer solution (A1-1) from which the basic substance and the like had been removed. The composition of the conductive polymer solution (A1-1) was analyzed by ion chromatography. As a result, it was found that 80% by mass or more of the residual monomers, 99% by mass or more of the sulfate ions, and 99% by mass or more of the basic substance (pyridine) had been removed. Further, the non-volatile content was measured and found to be 2.0% by mass. That is, the solids concentration of the conductive polymer solution (A1-1) is 2.0% by mass.

In this context, 1 sverdrup (SV) is defined as $1\times10^6$ m³/s (1 GL/s).

[Production of Water-Soluble Polymer (D)]

Production Example 3: Production of Water-soluble Polymer (D-1)

55 g of N-vinylpyrrolidone as a vinyl monomer having a nitrogen-containing functional group, 3 g of azobisisobutyronitrile as a polymerization initiator, and 1 g of n-dodecyl mercaptan as a chain transfer agent for introducing a terminal hydrophobic group were dissolved in 100 ml of isopropyl alcohol as a solvent with stirring to obtain a reaction solution. Then, the reaction solution was dropped into 100 ml of isopropyl alcohol, which had been heated to 80° C. in advance, at a dropping rate of 1 ml/min to carry out a drop polymerization. The drop polymerization was carried out while keeping the temperature of isopropyl alcohol at 80° C. After the dropping was completed, the resulting was matured at 80° C. for another 2 hours and then allowed to cool. Then, the resulting was concentrated under reduced pressure to have the obtained reaction product dried and solidified. After dissolving 5.3 parts by mass of the dried and solidified polymer in 95 parts by mass of water and cooling at 5° C. for 24 hours, the resulting was filtered through a 30 nm polyethylene filter to obtain a 5.0% by mass water-soluble polymer solution (D-1).

Example 1

25 parts by mass of the conductive polymer solution (A1-1) (0.5 parts by mass in terms of solid content), 0.21 part by mass of 1-(3-aminopropyl)-2-pyrrolidone as the basic compound (B), 70.79 parts by mass of water, and 4 parts by mass of isopropyl alcohol (IPA) were mixed to prepare a conductive composition.

With respect to the obtained conductive composition, the conductivity and surface smoothness were evaluated, and the resist loss test was conducted. The results are shown in Table 1.

Examples 2 to 8

A conductive composition was prepared by mixing the components so as to achieve a composition as shown in Table 1.

With respect to the obtained conductive composition, the conductivity and surface smoothness were evaluated, and the resist loss test was conducted. The results are shown in Table 1.

Comparative Examples 1 and 2

A conductive composition was produced and various evaluations were performed in the same manner as in Example 1, except that the amount of tetrabutylammonium hydroxide (TBAH) shown in Table 2 was used as the other basic compound instead of the basic compound (B). The results are shown in Table 2.

TABLE 1

|  |  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Conductive composition | Conductive polymer (A) [Part by mass] | A1-1 | 25 | 15 | 15 | 15 | 15 | 15 | 15 | 15 |
|  | Basic compound (B) | B-1 | 0.21 | 0.12 | 0.11 | 0 | 0 | 0 | 0.13 | 0.08 |
|  | [Part by mass] | B-2 | 0 | 0 | 0 | 0.15 | 0.13 | 0.10 | 0 | 0 |
|  | Compound (C) [Part by mass] | C-1 | 0 | 0.009 | 0.018 | 0 | 0.018 | 0.037 | 0 | 0.037 |
|  | Water-soluble polymer (D) [Part by mass] | D-1 | 0 | 0 | 0 | 0 | 0 | 0 | 14 | 14 |
|  | Solvent (E) | Water | 70.79 | 80.871 | 80.872 | 80.85 | 80.852 | 80.863 | 66.87 | 66.883 |
|  | [Part by mass] | IPA | 4 | 4 | 4 | 4 | 4 | 4 | 4 | 4 |
| Amount [part by mass] | (A)/((A) + (B) + (C) + (D)) |  | 70.4 | 69.9 | 70.1 | 66.7 | 67.0 | 68.6 | 26.5 | 26.9 |
|  | (B)/((A) + (B) + (C) + (D)) |  | 29.6 | 28.0 | 25.7 | 33.3 | 29.0 | 22.9 | 11.5 | 7.2 |
|  | (C)/((A) + (B) + (C) + (D)) |  | 0 | 2.1 | 4.2 | 0 | 4.0 | 8.5 | 0 | 3.3 |
|  | (D)/((A) + (B) + (C) + (D)) |  | 0 | 0 | 0 | 0 | 0 | 0 | 62.0 | 62.6 |
| Mass ratio | (B):(C) |  | 100:0 | 93:7 | 86:14 | 100:0 | 88:12 | 73:27 | 100:0 | 68:32 |
| Evaluation | Conductivity (Surface resistivity [Ω/sq.]) |  | $7.00 \times 10^8$ | $6.00 \times 10^8$ | $5.00 \times 10^8$ | $9.00 \times 10^8$ | $8.00 \times 10^8$ | $7.00 \times 10^8$ | $8.00 \times 10^8$ | $8.00 \times 10^8$ |
|  | Surface smoothness (Arithmetic mean roughness (Ra) [nm]) |  | 0.4 | 0.4 | 0.4 | 0.4 | 0.4 | 0.4 | 0.2 | 0.2 |
|  | Resist loss (Resist loss (f) [nm]) |  | 3 | 3 | 3 | 3 | 3 | 3 | 2 | 2 |

TABLE 2

|  |  |  | Comp. Ex. 1 | Comp. Ex. 2 |
|---|---|---|---|---|
| Conductive composition | Conductive polymer (A) [Part by mass] | A1-1 | 25 | 15 |
|  | Basic compound (B) | B-1 | 0 | 0 |
|  | [Part by mass] | B-2 | 0 | 0 |
|  | Compound (C) [Part by mass] | C-1 | 0 | 0 |
|  | Water-soluble polymer (D) [Part by mass] | D-1 | 0 | 14 |
|  | Other basic compound [Part by mass] | TBAH | 0.38 | 0.23 |
|  | Solvent (E) | Water | 74.62 | 70.77 |
|  | [Part by mass] | IPA | 0 | 0 |
| Amount [Part by mass] | (A)/((A) + (B) + (C) + (D) + TBAH) |  | 56.6 | 24.4 |
|  | (B)/((A) + (B) + (C) + (D) + TBAH) |  | 0 | 0 |
|  | (C)/((A) + (B) + (C) + (D) + TBAH) |  | 0 | 0 |
|  | (D)/((A) + (B) + (C) + (D) + TBAH) |  | 0 | 56.9 |
|  | TBAH/((A) + (B) + (C) + (D) + TBAH) |  | 43.4 | 18.7 |
| Mass ratio | (B):(C) |  | — | — |
| Evaluation | Conductivity (Surface resistivity [Ω/sq.]) |  | $2.00 \times 10^9$ | $8.00 \times 10^9$ |
|  | Surface smoothness (Arithmetic mean roughness (Ra) [nm]) |  | 0.8 | 0.7 |
|  | Resist loss (Resist loss (f) [nm]) |  | 3 | 3 |

In Table 1, "(A)/((A)+(B)+(C)+(D))" means an amount of the conductive polymer (A) with respect to 100 parts by mass of the total of the conductive polymer (A), the basic compound (B), the compound (C) and the water-soluble polymer (D). The same applies to the amounts of the basic compound (B), the compound (C) and the water-soluble polymer (D). "(B):(C)" means a mass ratio between the basic compound (B) and the compound (C) (basic compound (B):compound (C)).

In Table 2, "(A)/((A)+(B)+(C)+(D)+TBAH)" means an amount of the conductive polymer (A) with respect to 100 parts by mass of the total of the conductive polymer (A), the basic compound (B), the compound (C), the water-soluble polymer (D) and the TBAH. The same applies to the amounts of the basic compound (B), the compound (C), the water-soluble polymer (D) and the TBAH. "(B):(C)" means a mass ratio between the basic compound (B) and the compound (C) (basic compound (B):compound (C)).

Signs and acronyms in Tables 1 and 2 stand for the following compounds.
B-1: 1-(3-aminopropyl)-2-pyrrolidone
B-2: N-(3-aminopropyl)-ϵ-caprolactam
C-1: 1,5-diazabicyclo[4.3.0]-5-nonene (DBN)
TBAH: tetrabutylammonium hydroxide
IPA: Isopropyl alcohol As is clear from Table 1, the conductive compositions obtained in the Examples were able to form conductive films with less resist loss of the resist layer as well as excellent surface smoothness and conductivity.

On the other hand, as is clear from Table 2, the conductive films formed from the conductive compositions obtained in Comparative Examples 1 and 2 were inferior in terms of surface smoothness and conductivity as compared to the Examples.

INDUSTRIAL APPLICABILITY

The conductive composition of the present invention can be used as an antistatic agent applicable even to the next-generation process for semiconductor devices.

The invention claimed is:

1. A conductive composition comprising a conductive polymer (A) having an acidic group, and a basic compound (B) having a cyclic amide and an amino group in its molecule,
wherein the basic compound (B) is a compound represented by formula (1):

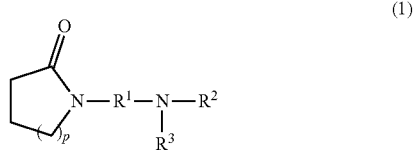

wherein $R^1$ represents a linear or branched alkylene group having 1 to 10 carbon atoms, each of $R^2$ and $R^3$ independently represents a hydrogen atom or a linear or branched alkyl group having 1 to 4 carbon atoms, and p represents an integer of 1 to 4.

2. The conductive composition according to claim 1, which further comprises a nitrogen-containing heterocyclic compound (C) containing two or more nitrogen atoms in its molecule.

3. The conductive composition according to claim 2, wherein a mass ratio of the basic compound (B) to the nitrogen-containing heterocyclic compound (C) (basic compound (B):nitrogen-containing heterocyclic compound (C)) is 0.5:99.5 to 99.5:0.5.

4. The conductive composition according to claim 1, which further comprises a water-soluble polymer (D) excluding the conductive polymer (A).

5. A conductive film formed of the conductive composition of claim 1.

6. A laminate comprising: a substrate; an electron beam resist layer, formed on at least one surface of the substrate; and a conductive film of claim 5, formed on the resist layer.

* * * * *